(12) United States Patent
Kesavan et al.

(10) Patent No.: US 10,095,480 B2
(45) Date of Patent: Oct. 9, 2018

(54) AUTOMATIC CODE GENERATION FOR CROWDSOURCED AUTOMATIC DATA COLLECTION

(75) Inventors: Vijay Sarathi Kesavan, Hillsboro, OR (US); Xingang Guo, Portland, OR (US); Anand Rangarajan, Hillsboro, OR (US); Victor Lortz, Beaverton, OR (US); Somya Rathi, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 827 days.

(21) Appl. No.: 13/993,099

(22) PCT Filed: Oct. 11, 2011

(86) PCT No.: PCT/US2011/055824
§ 371 (c)(1),
(2), (4) Date: Jun. 11, 2013

(87) PCT Pub. No.: WO2013/055322
PCT Pub. Date: Apr. 18, 2013

(65) Prior Publication Data
US 2013/0263084 A1    Oct. 3, 2013

(51) Int. Cl.
*G06F 9/44*    (2018.01)
*G06F 9/45*    (2006.01)
(Continued)

(52) U.S. Cl.
CPC .......... *G06F 8/30* (2013.01); *G06F 17/30864* (2013.01); *G06F 8/20* (2013.01); *G06F 8/34* (2013.01); *G06F 8/36* (2013.01)

(58) Field of Classification Search
CPC ..... G06F 8/30; G06F 8/20; G06F 8/36; G06F 8/34; G06F 8/24; G06F 9/4428; G06F 17/30607
See application file for complete search history.

(56) References Cited

U.S. PATENT DOCUMENTS 5,946,485 A    8/1999   Weeren
7,849,394 B2  12/2010   Tuschner
(Continued)

FOREIGN PATENT DOCUMENTS

EP    2348477 A1    7/2011
JP    2008-084259 A 4/2008
(Continued)

OTHER PUBLICATIONS

Amini et al., "Towards Scalable Evaluation of Mobile Applications through Crowdsourcing and Automation", Feb. 2013, Carnegie Mellon University, pp. 1-11; <https://pdfs.semanticscholar.org/94ac/ddc6c7df09dd298fb89d9fe362757ee2c640.pdf>.*

(Continued)

*Primary Examiner* — Thuy Dao
*Assistant Examiner* — Ben C Wang
(74) *Attorney, Agent, or Firm* — Trop Pruner & Hu, P.C.

(57) ABSTRACT

An automatic code generator that may be located at a server may generate code to handle crowdsourced data. The crowdsourced data may come from members of the public using automatic data collection technology on mobile devices, in one embodiment.

21 Claims, 3 Drawing Sheets

(51) Int. Cl.
*G06F 8/30* (2018.01)
*G06F 17/30* (2006.01)
*G06F 8/20* (2018.01)
*G06F 8/34* (2018.01)
*G06F 8/36* (2018.01)

(56) References Cited

U.S. PATENT DOCUMENTS

| | | | |
|---|---|---|---|
| 7,917,891 B2 | 3/2011 | Dinges | |
| 9,104,992 B2* | 8/2015 | Mital | G06Q 10/06 |
| 9,383,976 B1* | 7/2016 | Singh | G06F 8/34 |
| 9,749,780 B2* | 8/2017 | Huang | H04W 4/02 |
| 9,916,861 B2* | 3/2018 | DeLuca | H04N 1/00095 |
| 2003/0149958 A1 | 8/2003 | Baluja | |
| 2005/0076327 A1* | 4/2005 | Helal | G06F 8/20 717/106 |
| 2007/0067375 A1 | 3/2007 | Inaoka | |
| 2011/0173214 A1* | 7/2011 | Karim | G06F 17/3002 707/754 |
| 2011/0212717 A1* | 9/2011 | Rhoads et al. | 455/420 |
| 2011/0246148 A1* | 10/2011 | Gupta et al. | 703/2 |
| 2011/0295658 A1* | 12/2011 | Bastos et al. | 705/14.1 |
| 2012/0028649 A1* | 2/2012 | Gupta | G01S 5/0236 455/456.1 |
| 2012/0028654 A1* | 2/2012 | Gupta et al. | 455/456.3 |
| 2012/0102164 A1* | 4/2012 | Gruen | H04W 4/001 709/222 |
| 2012/0102165 A1* | 4/2012 | Gruen | G06F 8/60 709/222 |
| 2012/0123667 A1* | 5/2012 | Gueziec | 701/119 |
| 2012/0150822 A1* | 6/2012 | Young et al. | 707/690 |
| 2012/0158732 A1* | 6/2012 | Mital | G06Q 10/06 707/741 |
| 2012/0192239 A1* | 7/2012 | Harwell et al. | 725/109 |
| 2013/0066961 A1* | 3/2013 | Naik et al. | 709/204 |
| 2013/0084882 A1* | 4/2013 | Khorashadi et al. | 455/456.1 |
| 2013/0084891 A1* | 4/2013 | Khorashadi et al. | 455/456.3 |
| 2013/0173688 A1* | 7/2013 | Simpson | 709/203 |
| 2013/0197954 A1* | 8/2013 | Yankelevich et al. | 705/7.13 |
| 2013/0212191 A1* | 8/2013 | Suraj | H04L 51/32 709/206 |
| 2013/0275880 A1* | 10/2013 | Bachman | G06F 3/0481 715/751 |
| 2013/0297561 A1* | 11/2013 | Mizrotsky et al. | 707/609 |
| 2013/0311644 A1* | 11/2013 | Herger et al. | 709/224 |
| 2013/0317944 A1* | 11/2013 | Huang | G01S 5/0252 705/26.61 |
| 2013/0325856 A1* | 12/2013 | Soto Matamala et al. | 707/724 |
| 2014/0040179 A1* | 2/2014 | Herzog et al. | 706/52 |
| 2014/0173563 A1* | 6/2014 | Dias | G06F 8/36 717/123 |
| 2014/0201749 A1* | 7/2014 | Bao et al. | 718/102 |
| 2014/0278074 A1* | 9/2014 | Annapureddy et al. | 701/468 |
| 2014/0280316 A1* | 9/2014 | Ganick et al. | 707/769 |
| 2014/0366000 A1* | 12/2014 | Batabyal | G06F 8/61 717/120 |
| 2015/0135160 A1* | 5/2015 | Gauvin | H04W 4/21 717/109 |
| 2015/0262079 A1* | 9/2015 | Livshits | G06N 3/126 706/12 |
| 2016/0372153 A1* | 12/2016 | DeLuca | G11B 27/031 |
| 2017/0178240 A1* | 6/2017 | Abuelsaad | G06Q 40/06 |
| 2017/0178241 A1* | 6/2017 | Abuelsaad | G06Q 40/06 |
| 2017/0357486 A1* | 12/2017 | DeLuca | G06F 8/30 |

FOREIGN PATENT DOCUMENTS

| | | |
|---|---|---|
| JP | 2008084259 | 4/2008 |
| JP | 2008-242805 A | 10/2008 |
| JP | 2008241663 | 10/2008 |
| JP | 2008242805 | 10/2008 |
| WO | 2011106443 A1 | 9/2011 |

OTHER PUBLICATIONS

Gao et al., "Mining Reliable Information from Passively and Actively Crowdsourced Data", ACM, Aug. 2016, pp. 2121-2122; <https://dl.acm.org/citation.cfm?id=2945389>.*

Parthasarathy et al., "Automatic Broadcast News Summarization Via Rank Classifiers and Crowdsourced Annotation", IEEE, 2015, pp. 5256-5260; <https://ieeexplore.ieee.org/stamp/stamp.jsp?tp=&arnumber=7178974>.*

PCT International Search Report and Written Opinion issued in corresponding PCT/US2011/055824 dated May 29, 2012 (9 pages).

EP Extended Search Report in corresponding EP application No. 13749781.4 filed Dec. 14, 2014 (9 pages).

Muller, M., et al., "MoCoMapps—An Experiment in Crowdsourcing both Data and Applications for Mobile Services," CHI 2011 workshop, Data collection: By the people, for the people, Vancouver, Canada (4 pages).

Vinayakiyer: "Google App Inventor," CodeProject.com, 2011 (14 pages).

Wolber, D., "App Inventor and Real-world Motivation," 2011 Proceedings of the 42nd ACM Technical Symposium on Computer Science Education, NY, NY (6 pages).

Wolber, D. et al., "Communicating with Web APIs", in "App Inventor" May 3, 2011, O'Reilly Media, Inc. (16 pages).

CN office action in corresponding CN application No. 201180074071.0 dated Jun. 14, 2016.

EP search report in corresponding EP application No. 11874049.7 dated Apr. 23, 2015.

JP office action in corresponding JP application No. 2014-535697 dated Jun. 5, 2015.

JP office action in corresponding JP application No. 2014-535697 dated Mar. 1, 2016.

KR office action in corresponding KR application No. 2014-7009552 dated Jul. 10, 2015.

CN office action in corresponding CN application No. 201180074071.0 dated Sep. 22, 2017 (3 pages) [no English translation].

JP office action in corresponding JP application No. 2014-535697 dated Sep. 19, 2017 (21 pages).

CN office action in corresponding CN application No. 201180074071.0 dated Mar. 6, 2017 (6 pages) [no English translation].

EP Examination Report in corresponding EP application No. 11874049.7-1217 dated Jul. 18, 2018 (7 pgs.).

* cited by examiner

AUTOMATIC CODE GENERATION FOR CROWDSOURCED AUTOMATIC DATA COLLECTION

BACKGROUND

This relates generally to Internet websites that are populated by crowdsourced data.

Crowdsourced data is data that is provided by a large number of unknown individuals via the Internet. For example, in traffic collection systems, a map may be maintained about traffic conditions. The actual data may be provided by users of the roadways who supply information about traffic conditions they encounter. This information may then be collected and posted in a user friendly display.

Another traffic related use of crowd source data is in connection with websites which post information about speed traps. The source information comes from drivers who submit the information about the location of speed traps to a website.

One benefit of crowdsourced data is that it can be collected and displayed at almost no cost to the website host. Thus, because of its economic nature, functionality may be provided that would not otherwise be available because of prohibitive costs. By distributing the task of providing the data among a large number of people, a large amount of data, which may be very meaningful, may be collected and displayed, in some cases, in a fairly automated fashion.

DETAILED DESCRIPTION

In accordance with some embodiments, applications populated by crowdsourced data may be automatically generated by code generators. Thus, both the application and its constituent data may be developed at essentially no cost to the host. As a result, user customized applications may be readily made available and may be populated by crowdsourced data that may be collected from a sufficient number of individuals so that the burden on any one individual is relatively small, but the collective data and the resulting application may be very useful. Particularly, where the data collection is done automatically, the burden on the data suppliers may be small.

Figure 1:
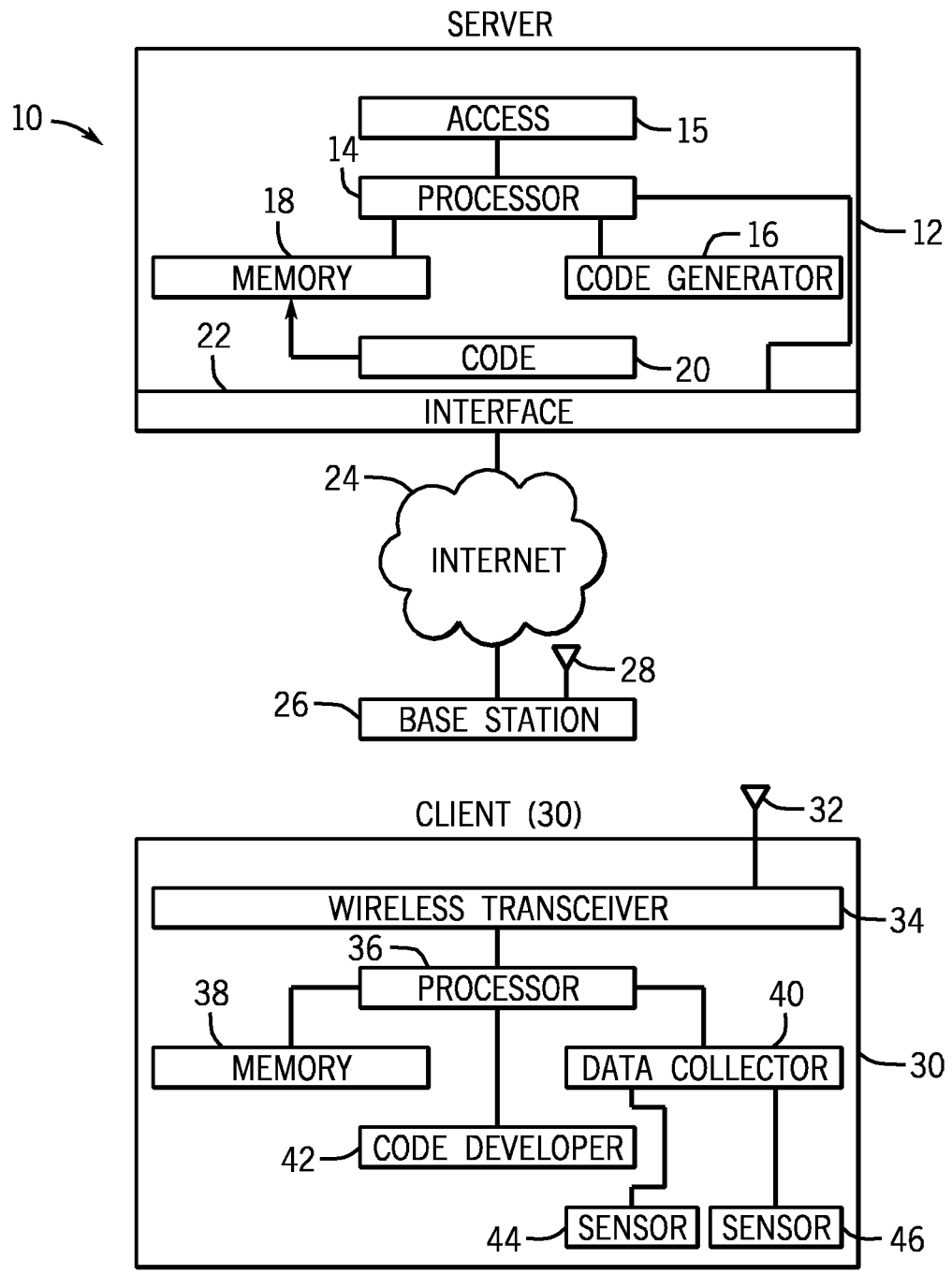
FIG. 1 is a schematic depiction of one embodiment of the present invention.

There are two basic constituents of the system 10, shown in FIG. 1, a server 12 and a client 30. The client 30 may be a wired or wireless device, coupled to the server 12, over the Internet 24. The Internet connection between the client 30 and a base station 26 may be over a wireless connection using antennas 28 and 32. Thus, in some embodiments, mobile data collection may be facilitated.

The server 12 may be part of the cloud, in one embodiment, and may include a processor 14, coupled to a memory 18. The processor 14 may also be coupled to an automatic code generator 16, which includes automatic code generators for automatically producing applications whose characteristics are selected by users who may use user interfaces to answer questions and to supply code input data, code function, and output data. The resulting code 20 may be stored in the memory in some embodiments.

An access control agent 15 may be provided in order to limit access to the code to only those persons who are authorized such access. An interface 22 may facilitate the interaction of the server 12 with the Internet 24.

A base station 26 with an antenna 28 may be used in wireless embodiments to communicate with the client 30 and its antenna 32.

The client 30 may include a wireless transceiver 34, coupled to the antenna 32. The wireless transceiver may communicate with a processor 36, in turn coupled to a memory 38, a code developer 42, and a data collector 40. The data collector 40, in some embodiments, may be an automatic data collector, which automatically collects crowdsourced data from willing participants. For example, information about the current position of the user may be collected automatically, in some cases without actually bothering the user with a request to release the information. In other cases, limitations may be placed on data collection.

Thus, the data collector 40 may be coupled to available sensors 44 and 46. The available sensors may include global positioning system sensors which sense the user's current position, accelerometers that sense the user's current extent/speed of motion, microphones which sense ambient noise, cameras that detect ambient objects, and other conventional sensors. The code developer 42 is an interface that may work with the code generator 16 to supply the information that the code generator needs to custom design the code desired by a user. Thus, a user may be posed a number of questions. The user's answers dictate how the code is developed, what it does, and how it provides its outputs.

The code developer 42 may provide a user interface with options that may be mouse or touch screen selected, as examples, by the user to specify what the code does and how the code will perform. Then the code generator 16 actually generates the source code and stores it, as source or object code, on the server for access, not only by the author of the code in some cases, but by members of the public as well.

As an illustrative and non-limiting example, a person may wish to have a website that provides information about available WiFi hot spots. The user may specify the type of input information that willing participants may provide. That information, for example, could be global positioning system coordinates of WiFi sites. The action that may be taken may be to compile lists of global positioning system coordinates of websites and to determine the distance between a requesting user and the nearest WiFi hot spot. The output may be to provide a map showing where the user who is requesting the service currently is located and where the closest WiFi hot spot is. This may be determined by collecting data about the user's current position when the user indicates that the user is present at a WiFi hot spot and comparing it to data already collected about the location of WiFi hot spots.

Then willing users may be asked to indicate when they are at a WiFi hot spot and, in response to such indication, the global positioning system coordinates may be grabbed automatically. The code generator then provides an application that automatically collects information from willing users and automatically serves it out to authorized requesting users. This may be done without any programming interaction from human programmers and may enable a website to be populated entirely by information provided at no cost from volunteers in some embodiments. Thus, the possibility of generating customized, low cost, grassroots originated websites provides enormous opportunities and benefits in some cases.

Figure 2:
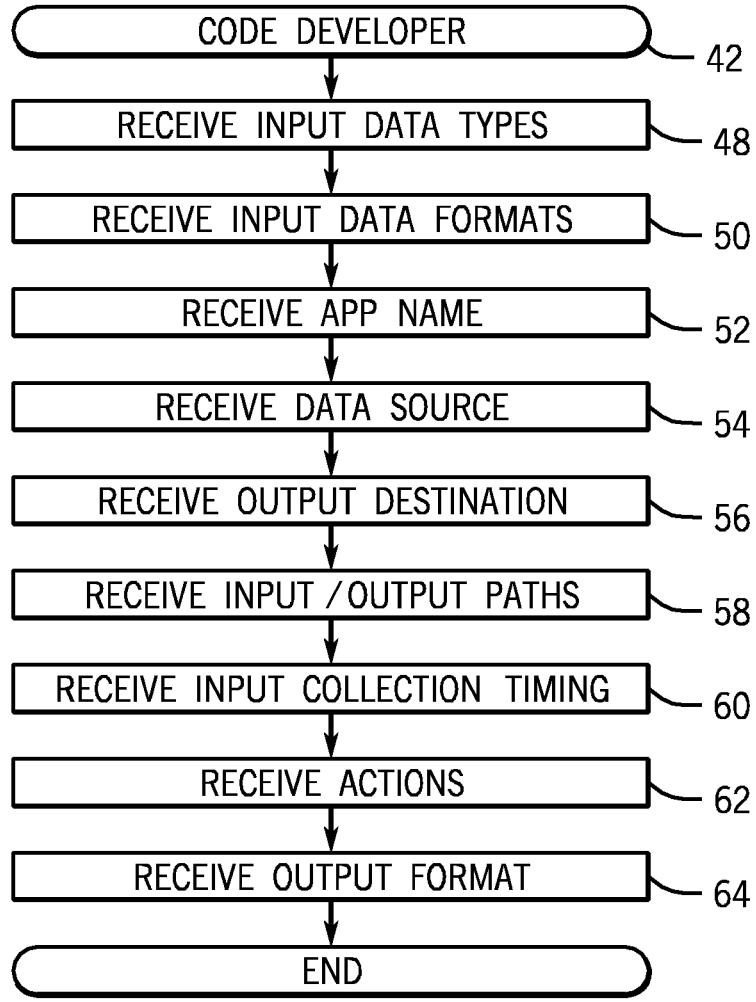
FIG. 2 is a flow chart for a code developer in accordance with one embodiment of the present invention.

Referring to FIG. 2, the code developer 42 may be implemented by software, firmware, and/or hardware. In software and firmware embodiments, it may be implemented by computer executed code stored on a non-transitory computer readable medium, such as a magnetic, optical, or semiconductor memory. In some cases, the code developer may be resident on the client device 30, but, in other cases, it may be resident at the base station 26 or the server 12, to mention some examples.

The code developer 42 may generate a plurality of graphical user interfaces that pose queries to a potential code initiator to enable the code generator 16 to automatically generate code to implement a user envisioned function. In some embodiments, dropdown boxes may offer a plurality of mouse or touch selectable responses to those queries. Thus, in one embodiment, the code developer sequence may receive input data types, as indicated at block 48. For example, in the WiFi example given above, the input data types would be global positioning system coordinates. Then it may receive input data formats, as indicated in block 50. The formats may specify a particular data format for automatically collected data, such as global positioning system coordinates in a particular electronic data format, in the WiFi example.

Then, in some embodiments, an application name may be received at block 52 in order to associate the developed code with a user accessible name. Next, data sources may be identified, as indicated in block 54. The data sources may indicate what sensor should be activated in order to collect crowdsourced information from data providers. The output destination may be received at block 56. This may specify what types of client devices or other devices may receive the output from the code generator 16. Based on the type of these devices, the format of the output may be determined. For example, different formats may be necessary for cell phones than would be needed for desktop computers.

Next, input/output paths may be received and specified, as indicated in block 58. This indicates how the information should be conveyed and transmitted. For example, the information may be conveyed and/or transmitted over the Internet or over the cellular telephone network, as two examples. Next, input collection timing may be received at block 60. This may specify how often data may be collected or uploaded to the server from collecting client devices. The actual actions that the developed code will take may be specified in block 62. Thus, in the example, the action would be to compare the user's current position with the available WiFi hot spots, determine which one is closest and provide an indication on a map of the closest WiFi hot spot to the user's current position.

Finally, the specified output format may be received at block 64. This may include the graphical characteristics of the output, the text associated with it, the electronic format, and other information that is considered useful.

Figure 3:
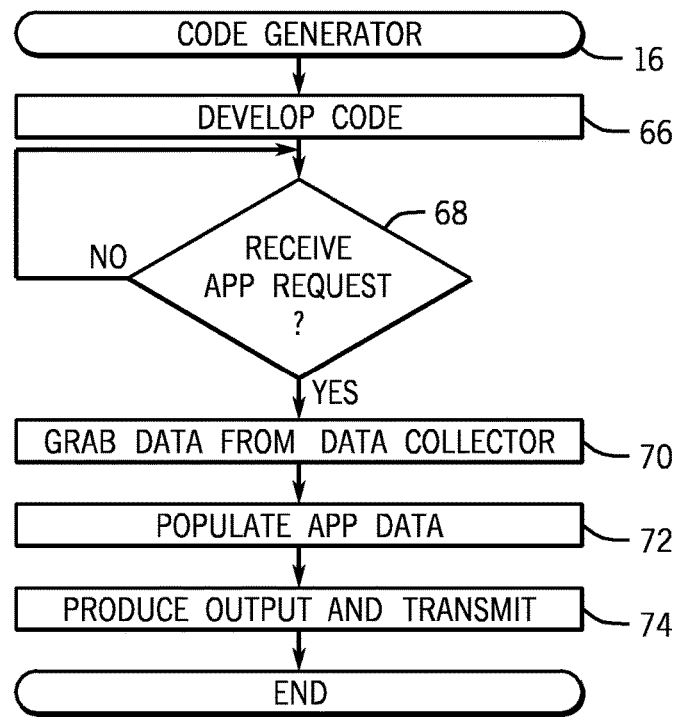
FIG. 3 is a flow chart for a code generator in accordance with one embodiment of the present invention.

Moving on to FIG. 3, the code generator 16 may be implemented in software, hardware, and/or firmware. In software and firmware embodiments, it may be implemented by computer executed code stored on a non-transitory computer readable medium, such as a semiconductor, magnetic, or optical storage. Generally, the code generator may be located on the server 12, but, in some embodiments, it could also be available on the base station 26 and/or the client 30. In a hardware embodiment, the code generator may include a processor.

The sequence 16 begins by developing the code or application, as indicated in block 64, using the inputs provided by the code developer 42. Then, a check at diamond 68 determines whether there has been a request to actually use the application. If so, the data needed to produce an output is grabbed from an automatic data collector, as indicated in block 70. In some cases, the data collector may be associated with requesting individual and, in other cases, this operation may involve updating the information from all of the client devices that have collected data, but has not yet uploaded it to the server. For example, the user's cellphone may be used to grab the user's GPS coordinates when the user indicates the user is at a WiFi hot spot, in the example discussed above. Thus, the output generated by the code 20 may be updated. Next, in block 72, the application data is populated into the code and, in block 74, the requested output is provided and transmitted in the requested or specified way.

Figure 4:
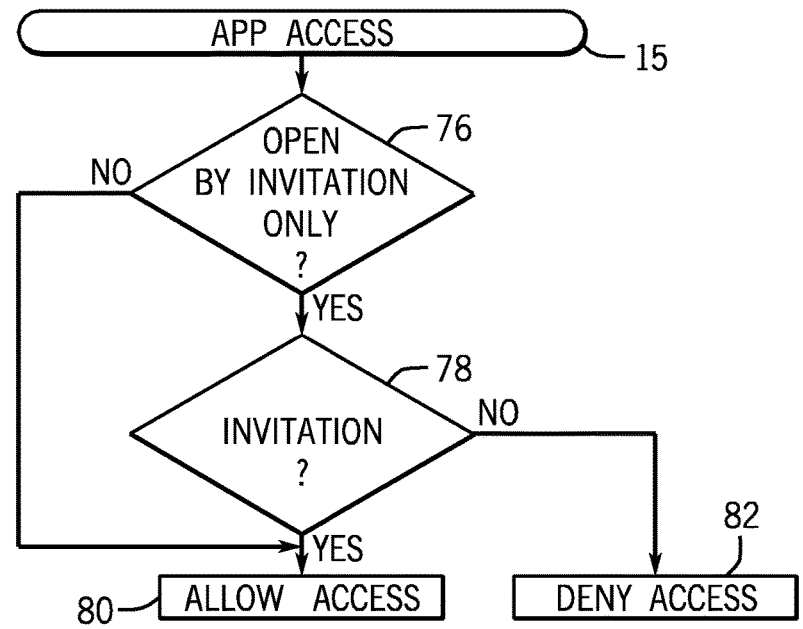
FIG. 4 is a flow chart for a sequence for controlling access to a code generated application in accordance with one embodiment of the present invention.

Turning finally to FIG. 4, an application access control 15 may be provided to limit those persons who can access any applications that have been developed. The application access control 15 may be implemented in hardware, software, and/or firmware. In software and firmware embodiments, it may be implemented by computer executed instructions stored in a non-transitory computer readable medium, such as a magnetic, semiconductor, or optical storage. The application access control 15 may be implemented anywhere, including the server 12, the base station 26, the client 30, to mention some examples.

In one embodiment, a check at diamond 76 determines whether access is available only upon invitation or under other limitations, including payment of an access fee. If so, a check determines whether the invitation or other limitations have been satisfied, as indicated at diamond 78. If not, access is denied, as indicated in block 82 and, otherwise, access is allowed, as indicated in block 80.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
providing an interface to enable providers of crowdsourced data to specify a function for a source code application to handle crowdsourced data from an automatic data collection device; and
automatically generating using an automatic code generator, the source code for the source code application in response to the crowdsourced data, said source code to implement, said function.

2. The method of claim 1 including automatically collecting position information data.

3. The method of claim 1 including automatically collecting photographic information.

4. The method of claim 1 including controlling access to the generated code.

5. The method of claim 1 including collecting information from mobile computers.

6. The method of claim 1 including automatically generating code at a server.

7. The method of claim 6 including automatically collecting crowdsourced data from mobile devices.

8. A non-transitory computer readable medium storing instructions to enable a computer to:
   providing an interface to enable providers of crowdsourced data to specify a function for a source code application to handle crowdsourced data from an automatic data collection device; and
   automatically generate using an automatic code generator, the source code for the source code application in response to the crowdsourced, said source code to implement, said function.

9. The medium of claim 8 further storing instructions to automatically collect position information data.

10. The medium of claim 8 further storing instructions to automatically collect photographic information.

11. The medium of claim 8 further storing instructions to control access to the generated code.

12. The medium of claim 8 further storing instructions to collect information from mobile computers.

13. The medium of claim 8 further storing instructions to generate code at a server.

14. The medium of claim 13 further storing instructions to collect crowdsourced data from mobile devices.

15. An apparatus comprising:
   a hardware processor to provide an interface to enable providers of crowdsourced data to specify a function for a source code application to handle crowdsourced data from an automatic data collection device and automatically generate using an automatic code generator, the source code for the source code application in response to the crowdsourced data, said source code to implement said function; and
   a storage coupled to said processor.

16. The apparatus of claim 15, said hardware processor to automatically collect position information data.

17. The apparatus of claim 15, said hardware processor to automatically collect photographic information.

18. The apparatus of claim 15, said hardware processor to control access to the generated code.

19. The apparatus of claim 15, said hardware processor to collect information from mobile computers.

20. The apparatus of claim 15 wherein said hardware apparatus includes a server.

21. The apparatus of claim 20, said hardware processor to automatically collect crowdsourced data from mobile devices.

* * * * *